Jan. 13, 1970 R. G. FARNSWORTH 3,489,924

PULSE COUNTER DRIVING CIRCUIT

Original Filed July 31, 1963 3 Sheets-Sheet 1

Inventor,
Richard G. Farnsworth,
by Francis K. Doyle
His Attorney.

Inventor,
Richard G. Farnsworth,
by Francis K. Doyle
His Attorney.

Inventor:
Richard G. Farnsworth,
by Francis X. Doyle
His Attorney.

United States Patent Office 3,489,924

Patented Jan. 13, 1970

3,489,924
PULSE COUNTER DRIVING CIRCUIT

Richard G. Farnsworth, Dover, N.H., assignor to General Electric Company, a corporation of New York Original application July 31, 1963, Ser. No. 299,077. Divided and this application July 27, 1966, Ser. No. 578,907.
Int. Cl. H03k *17/02*
U.S. Cl. 307—246 3 Claims

ABSTRACT OF THE DISCLOSURE

A pulse counter driving circuit using solid state components. A pair of silicon controlled rectifiers, normally off are serially connected with one of the silicon controlled rectifiers connected to drive a pulse counter. A normally charged capacitor is connected to the junction of the pair of silicon controlled rectifiers. A transistor in a normally off condition is connected between an input line and to the gate or control electrode of the one silicon controlled rectifier. An input pulse triggers the transistor which turns on the one silicon controlled rectifier to discharge the capacitor to the pulse counter. When the capacitor is discharged, the one silicon controlled rectifier turns off and provides a pulse to turn on the other silicon controlled rectifier to thereby recharge the capacitor.

This is a division of application Ser. No. 299,007, filed July 31, 1963, which is assigned to the same assignee as this present application.

This invention relates to totalizer devices and, more particularly, to an impulse totalizer using solid state components.

In many present day operations various pulse generating and pulse counting devices are utilized to generate and count pulses corresponding to a variety of measurable quantities. Examples of these quantities which might be measured in pulse form include kilowatt hours, gallons, tons, yards of material and the like. In many instances it has been found desirable to provide a totalizing device to totalize the counts from a plurality of pulse generating devices. In general, such totalizers are required to accept a plurality of inputs from a number of pulse generating devices and to provide an output to a single counting and/or recording device which will count and/or record the total of the various inputs. In the main, a totalizer acts as a summational relay to connect a number of measuring devices to a single recording end device.

Many mechanical totalizers are presently used to perform this summational function. However, these mechanical devices suffer from a number of deficiencies. These deficiencies are well known in the art and include, among others, the wearing of the mechanical parts, the inaccuracy under many conditions of use, and the requirement for substantial periodic maintenance of the mechanical totalizer. It is also well known that mechanical devices are inherently slow and do not lend themselves to use with many present day high speed, electronic counting devices. It is thus clearly desirable to provide a solid state totalizer to eliminate the various deficiencies found in mechanical totalizers.

Some solid state totalizers have been proposed, however, these require the adjustment of the pulse rate of each pulse generating device in accordance with the total number of pulse generating devices that are connected to the totalizer. These devices also require the use of a separate timing pulse source to actuate the various input components which are connected to the various pulse generating devices which feed the input components of the totalizer.

In general, the pulse rate of the timing source must be changed each time a change is made in the number of pulse generating devices which are connected to the totalizer. Also, most presently known totalizers do not provide for individual pulse counters to provide a running count of the total of each individual pulse generating device. This has been found desirable in many instances, and may also serve as a monitoring device of the various pulse generating units which are connected to the totalizer.

In many present day totalizers it is generally not possible to readily include subtraction functions in the event that certain pulse quantities should be subtracted from the total count of the various impulse counting devices. Further, many totalizer devices have an inherent inaccuracy due to their tendency to add superfluous counts under some conditions. For example, in many devices a momentary loss of power will generally result in a superfluous count being added to the total when the power is restored.

From the above it will be obvious that there is a present need for a solid state totalizer which will accept counts from any number of input devices without changing pulse rates, and which will not add superfluous counts under any conditions of operation. There is also a need for a totalizer which will provide for both the addition and subtraction of generated pulses.

It is, therefore, one object of this invention to provide a novel pulse count totalizer utilizing solid state components.

Another object of this invention is to provide a novel solid state totalizer which does not require any external or separate timing devices.

A further object of this invention is to provide a novel, solid state pulse totalizer which is automatically operated by any incoming pulse which is to be totalized.

A still further object of this invention is to provide a novel solid state totalizer in which any number of input devices may be used without changing the pulse rate of the totalizer.

A still further object of this invention is to provide a novel solid state totalizer which may use any number of input devices and which may add or subtract the pulses of such devices, as desired.

A still further object of this invention is to provide a novel solid state totalizer which will not record superfluous counts under any possible operating condition.

Yet another object of this invention is to provide a novel solid state totalizer which includes a plurality of inputs, which inputs may be added or subtracted as desired, and which may be provided with individual counting mechanisms to provide a running count of each of the input devices.

In carrying out this invention in one form, a solid state totalizer is provided having a plurality of input channels for accepting random input pulses from a number of pulse generating devices. Each input channel is connected to an individual input circuit which comprises a bi-stable, solid state electrical component which is triggered to an "on" condition by each pulse input received. The output of each positive pulse input circuit operates a logical OR component which in turn actuates an electrical pulse delay means. At the end of a desired delay, the delay means sends a reset pulse to the input circuit for resetting such input circuit to its "off" condition. On resetting the input circuit will send a pulse to a second logical OR component. This second logical OR component sends a pulse out in two directions. The first direction is to the output device to record the pulse, the other direction is back to the first OR circuit which again actuates the delay means. A pulse from the delay means is again sent to the input circuit.

This delay pulse is sent serially through the positive input circuits and will act to reset any input circuit which is in its "set" or "on" condition. If no input circuit is in an "on" condition, the delay pulse will not actuate any of the positive input circuits. If a subtractive channel or channels are desired such channel will be connected to individual input circuits whch comprise a bi-stable component as in the positive input circuits. However, the subtractive input circuits are placed serially in the output line of the second OR component and serve to subtract any pulse from the second OR component when any subtract input circuit is in its "on" condition.

The invention which is desired to be protected will be clearly pointed out and distinctly claimed in the claims appended hereto. However, it is believed that this invention and the manner in which its objects and advantages are obtained, as well as other objects and advantages thereof, will be more clearly understood from the following detailed description of a preferred embodiment thereof, especially when considered in the light of the accompanying drawings, in which:

This invention relates to a solid state totalizer device which may be used in any number of operations for totalizing a plurality of random pulse inputs from a plurality of pulse generating devices. The totalizer finds utility, for example, in the electric utility art as a totalizer for demand metering. However, as will be apparent, the solid state totalizer of this invention has application in a wide variety of multi-input counting applications. The solid state totalizer will accept random inputs on any number of input channels and will feed these pulses to a single output channel with a minimum time spacing between the output pulses regardless of the input pulse time spacing. It will readily accept coincident input pulses arriving on more than one channel and will hold such input pulses in temporary storage and feed them out with a minimum time spacing. Pulses which are received at the input with a time spacing greater than this minimum will, of course, be fed out as they are received at the input.

Figure 1:
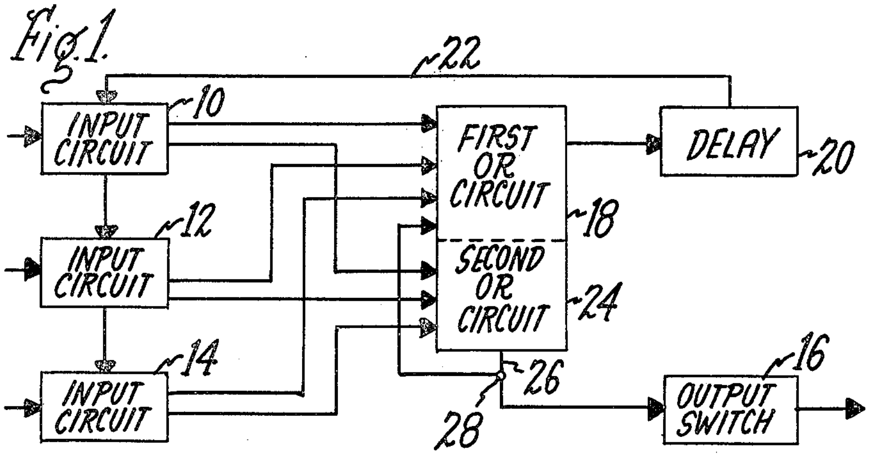
FIGURE 1 is a block diagram of one form of a preferred embodiment of the solid state totalizer of this invention.

A block diagram of a preferred solid state totalizer is shown in FIG. 1 of the drawing. As is shown in FIG. 1, the solid state totalizer comprises a plurality of input circuits, three being shown in the drawing as input circuits 10, 12 and 14. Each input circuit will receive a random impulse from any particular type of pulse generating device which may indicate any type of measurable quantity, such as for example, some specific number of kilowatt hours. In the example shown in FIG. 1 of the drawing, the solid state totalizer receives impulses over the three channels, indicated by arrows, to the three input circuits 10, 12 and 14 and sequentially adds these pulses by relaying in serial form through an output switch 16 to any type of counting and/or recording end device.

The logical explanation of the totalizer set forth in FIG. 1 is as follows. Consider a single input pulse arriving on the input channel to input circuit 10. The single pulse, which, as will be understood, may be derived from any type of pulse generating device, is fed into input circuit 10. This pulse will trigger the bi-stable multivibrator of input circuit 10 to its "on" condition. As will be understood, each input circuit comprises a bi-stable multivibrator element and each of these elements are biased to be in an "off" condition when power is first applied. The multivibrator element of input circuit 10, in being placed in an "on" condition will send a pulse to the first OR circuit, indicated by the numeral 18. As is shown in FIG. 1, each input circuit is provided with a lead into the OR circuit 18.

The pulse which comes from input circuit 10 to the OR circuit 18 will actuate the first OR circuit 18 to send a pulse which will trigger the delay unit 20. The delay unit 20 is a mono-stable multi-vibrator and is set for the desired delay in accordance with the particular type of end device being fed by the totalizer. At the end of the desired delay period the multi-vibrator element in delay unit 20 will revert to its normally "off" condition, and in going off generates a pulse which will be sent as a reset pulse over line 22 into input circuit 10. The pulse from line 22 into input circuit 10 resets the bi-stable element of input circuit 10 to its normally "off" condition and in so setting sends a pulse out to the second OR circuit 24 which, as indicated, has a separate input from each of the input circuits.

The pulse from input circuit 10 to the second OR circuit 24 actuates the second OR circuit causing a pulse to be sent out over line 26. As shown, the pulse over line 26 will go in two direction from a junction 28. First, the pulse will go from OR circuit 24 and junction 28 back to the first OR circuit 18. Secondly, the pulse will go from junction 28 into output switch 16. As will be understood, from output switch 16 the pulse is fed to the desired recording and/or counting end device.

The first path of the pulse out of OR circuit 24 is back to OR circuit 18 from junction point 28. This pulse into the first OR circuit 18 will act in the same manner as the previous pulse into the first OR circuit. The pulse will actuate the OR circuit to send a pulse to the delay circuit 20, thereby, starting the mono-stable element of the delay unit 20. After the delay period, the delay unit returns to its normal state and sends a second reset or interrogation pulse over line 22 to the input circuit 10. If the bi-stable element of input circuit 10 had not been set by the receipt of a second pulse over the input channel since the last reset, then the reset pulse from line 22 would feed directly through circuit 10 and on to the second input circuit 12. If this circuit was not set, the pulse would then be fed on through to the third input circuit. If this circuit had not been set then of course the pulse chain would stop. However, if any of the input circuits 10, 12 or 14 had been set by the receipt of a pulse during the operation of the previous recording of the pulse counted in the first input circuit 10, then the reset or interrogation pulse from the delay unit 20 would automatically operate to reset the circuit, for example input circuit 12, and cause the reset pulse to go to the second OR circuit 24, thereby causing a second pulse to be read out from the output switch 16.

As will be understood, simultaneous inputs on more than one of the input channels, or inputs which had been received on the same channel during the delay time, will continue the above action with each reset of an input circuit resulting in another shot of the delay unit 20 and thereby causing a reset of the input circuit and having a pulse count into the second OR circuit 24.

From the above it will be apparent that there is no theoretical limit to the number of channels which can be accommodated. The channels would merely each have an input circuit similar to input circuit 10 and which would be in series with input circuits 10, 12 and 14 as far as the reset pulse from delay unit 20 is concerned.

Each input circuit would have a separate lead in to the first OR circuit 18 and the second OR circuit 24. It will be noted that the input circuits are not reset by any clock or other timing mechanism but instead employ what may be termed a "self-triggering scan" which sends the reset pulse, when called for by an input pulse which sets one of the input circuits. It should also be noted that the delay reset pulse is not delayed by any of the input channels which are not in their "on" or "set" condition. As will be apparent there is always one extra reset pulse beyond the number of inputs being counted at any given series with the additional pulse being a check which ascertains that no input counts are being held in temporary storage in any of the input circuits 10, 12 or 14. From the above it will be apparent that by means of the solid state totalizer set forth in this invention that a solid state totalizer is provided which may accommodate any desired number of input channels and which does not need any separate timing circuit in order to provide the desired scanning and resetting of the various input circuits of the totalizer.

Figure 2:
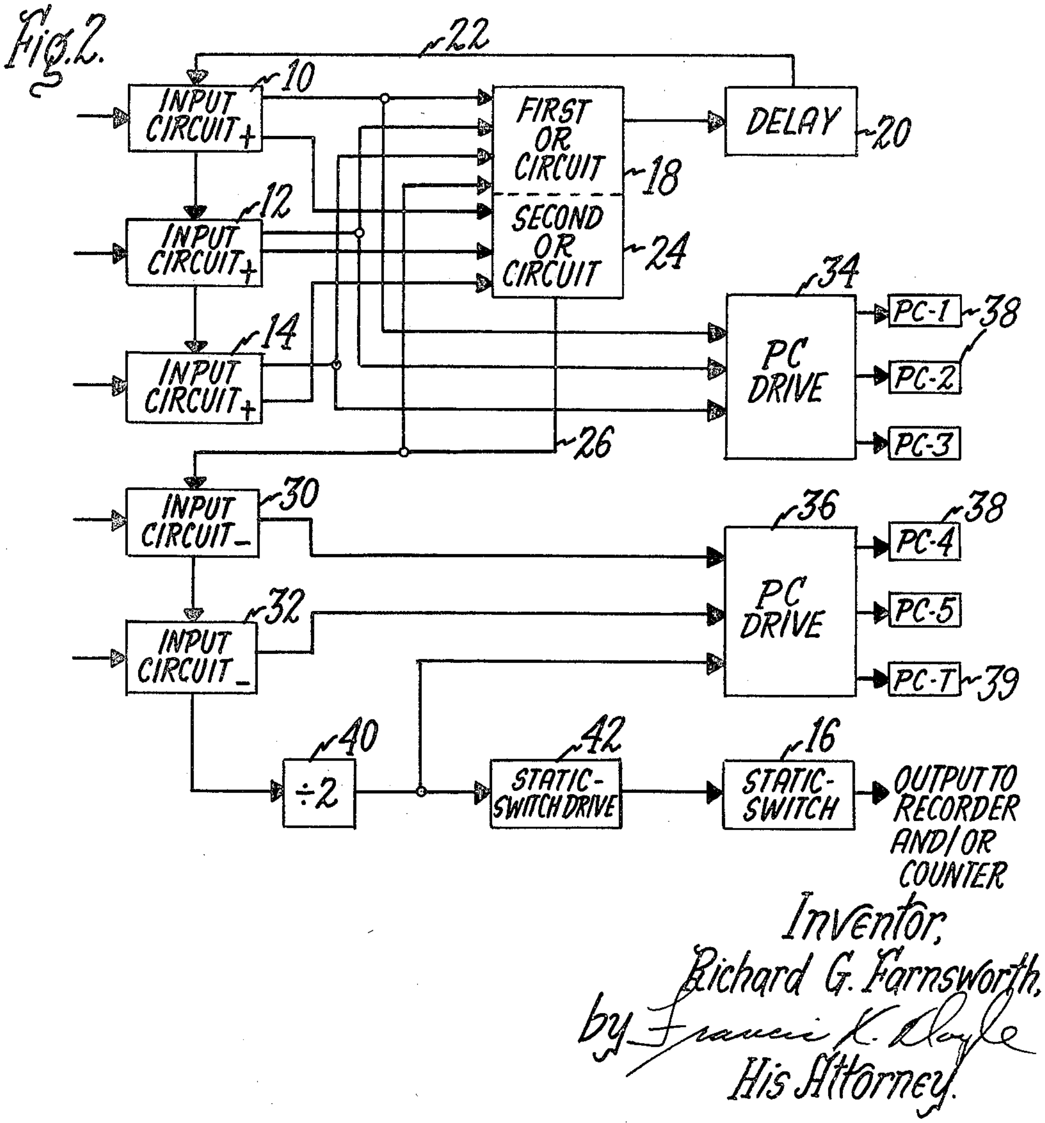
FIGURE 2 is a block diagram showing a second embodiment of the preferred form of the solid state totalizer of this invention.

Referring now to FIG. 2 of the drawings, there is shown therein a block diagram of a second embodiment of the solid state totalizer of this invention. As is shown in FIG. 2, subtractive input circuits have been placed in the totalizer and, additionally, pulse counter driving circuits are provided to actuate channel monitoring counters to provide a running count of the actions of each of the input channels, as well as a running count of the total being counted out by the totalizer. It will be understood that the totalizer of this invention will function equally well with additive channels only or with both additive and subtractive channels, as well as with or without the individual channel monitoring counters. FIGURE 2 is similar to FIG. 1 in that the three input circuits 10, 12 and 14 are provided, and the first OR circuit 18 and the second OR circuit 24 are the same as provided in FIG. 1. In a similar manner the delay unit 20 is also provided between the first OR circuit 18 and the first input circuit 10. Additionally, subtractive input circuits 30 and 32 are provided. As will be apparent from a comparison of FIGS. 1 and 2, when a pulse is taken from the second OR circuit 24 to drive the output switch 16 the pulse goes from junction 28 through the first subtractive input circuit 30 and the second subtractive input circuit 32 and then through a divider circuit 40 and a driver circuit 42 to the output switch 16.

As will be apparent to those skilled in the art, the input circuits 30 and 32 are similar to input circuits 10, 12 and 14 in that a pulse into input circuit 30 will place the circuit in its "on" or "set" condition. The input circuits 10, 12, 14, 30 and 32 are identical circuits then, and only their interconnections are different. Any pulse coming from OR circuit 24 into circuit 30, after circuit 30 is "set", will then cause a resetting of circuit 30. However, since there is no reset output from circuit 30, the resetting of circuit 30 by the pulse from the second OR circuit 24 will in effect subtract, by cancellation, the positive pulse coming from the second OR circuit 24. If circuit 30 had not been set, the pulse from the second OR circuit 24 will feed on through to the second subtractive input circuit 32. If the bi-stable element of the second subtractive input circuit 32 has not been "set" or "turned on" then the pulse from the second OR circuit 24 will feed through circuit 32 and eventually to the output switch 16. Output switch 16 would thereby provide a count of the pulse to the single recording end device which is driven by the totalizer of this invention. It will be apparent that by use of the subtractive input circuits 30 and 32 on the output of the second OR circuit 24 that the subtraction of a pulse is actually the cancellation of the pulse output of the second OR circuit 24.

From this it will be apparent that there is no theoretical limit to the number of channels which may be placed in the totalizer as subtractive channels since each of the subtractive channels would merely have an input circuit inserted in the chain of subtractive input circuits 30 and 32. Thus, it will be apparent, that as many input channels as are desired may be placed into the totalizer of this invention and as many additive channels and subtractive channels may be used as are desired.

As is shown in FIG. 2, individual channel monitoring pulse counters may be provided in the totalizer of this invention, if desired. If such monitoring is desirable, drive circuits such as drive circuits 34 and 36 will be provided, each of the drive circuits having connections from the various input circuits, as indicated in the drawing. As will be apparent from the drawing, the set pulse from input circuit 10, which actuates the first OR circuit 18, is also fed to the drive circuit 34 and actuates the drive circuit to count the pulse into the channel monitoring counter, indicated at 38. As will be understood, there is a channel monitoring counter for each of the input channels, as well as a totalizing counter which will count the total pulses sent out to the output switch 16.

As shown in the drawing, each of the drive circuits 34 and 36 is shown as being provided with three inputs and three outputs. In the preferred modular construction of the solid state totalizer of this invention it has been found that the desired size of modules will normally be such that only three drive circuits can be provided in each separate module. However, it will be understood that as many drive circuits as are desired may be provided and it is not necessary that the device be a modular totalizer. Therefore, it will be understood, FIG. 2 of the drawing is merely the preferred embodiment and such showing is not a limitation on the driving mechanism which may be utilized in the invention. However, it will be apparent that by means of the pulse counter driving means 34 and 36 which are connected to each of the individual input circuits, in the manner shown in FIG. 2, that the totalizer may be provided with channel monitoring counters, if desired, and such counters may be readily actuated by means of the pulse counter driving circuits shown.

FIGURE 2 also shows a dividing circuit 40 and a switch driving circuit 42 as part of the block diagram of the second embodiment of the solid state totalizer of this invention. As will be understood by those skilled in the electric utility field, in many instances it is desired that the totalizer device be capable of dividing the total input to the totalizer by some whole number. The term "total input" will be understood to mean the total number of positive input pulses less the total number of negative or subtractive pulses. To provide this capability a divide-by-circuit 40 may be provided, as shown in FIG. 2. As will be understood, the divide-by circuit 40, indicated as a divide-by two circuit, will generally comprise a bi-stable multivibrator circuit connected as a counter to provide one pulse out for each two pulses into the circuit. Obviously, other division may be used. For example, if two bi-stable multivibrators are connected as a counter, the circuit may be used as a divide-by three or a divide-by four circuit. Any number of bi-stable multivibrators may be connected to provide any desired whole number input-output ratio. Of couse, as will also be understood, a single mono-stable multvibrator may be used to provide one output pulse for each input pulse. As is indicated in FIG. 2, it is preferred to actuate the total pulse counter mechanism 39 from the output of the divide-by circuit 40, as is indicated by the line 44 as providing an input to the pulse counter drive 36. The switch driving circuit 42 will be discussed in detail later in this description.

Figure 3:
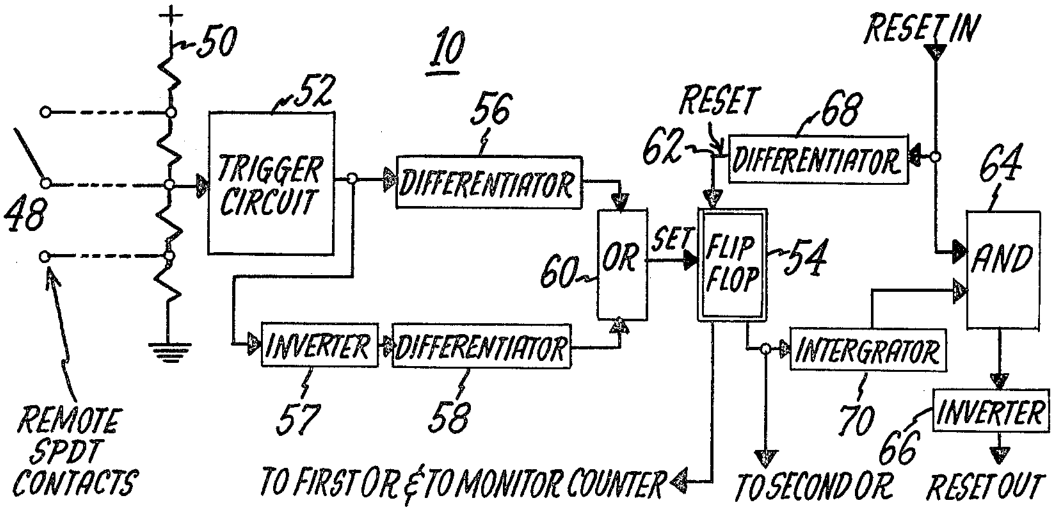
FIGURE 3 is a block diagram of a preferred form of the input circuit which may be used in the preferred embodiment of this invention.

Reference will now be made to FIG. 3 of the drawing which shows in block form the internal logic blocks of one input circuit of the totalizer of this invention. FIGURE 3, for example, shows the input circuit 10. As shown in FIG. 3, circuit 10 is connected to a set of remotely located single pole, double throw contacts 48 which constitute the pulse generator for this channel of the totalizer. These contacts 48, as shown in FIG. 3, would be connected to the input circuit 10 at a resistor divider circuit 50. As will be understood, each contact change is to be counted as a single pulse with a complete cycle of the contacts "on" and "off" being two counts. However, any desired system may be set up. As will be understood, the showing here is the common use of a single pole, double throw contact in electric utility demand metering practice.

The contact change is seen by the Schmitt trigger circuit 52 as a voltage level change at the resistor divider input 50. The voltage level change will flip the Schmitt trigger to one of its two stable conditions. As will be understood, the Schmitt trigger circuit may be biased for overlap so that its state will remain unchanged for an open contact condition and the circuit will therefore be stable throughout either contact bounce or arcing. The state of the Schmitt trigger circuit 52, changed in either direction, is used to "set" a temporary storage flip-flop 54 through either a differentiator 56 or an inverter 57 and a differentiator 58 as shown.

One output of the flip-flop circuit 54 is taken to the first OR circuit 18, which will recognize only the "set" pulses, while the other output from the flip-flop 54 is taken to the second OR circuit 24, which will recognize only the "reset" pulses. A reset pulse is provided to the flip-flop over the line 62. The reset pulse also goes to an AND gate 64. An output from the AND gate is only provided if the flip-flop 54 is in its reset condition. The output from AND gate 64 is fed through an inverter 66 which, as is understood, will reshape and invert the pulse such that the reset out line will carry a pulse capable of forming the same resetting function on the next input circuit.

The pulse fed to the AND gate is also fed through differentiator 68, as indicated, to reset flip-flop 54. However, it will be understood that the reset pulse will not first reset the flip-flop 54 and then AND with itself. This is due to the accumulated delays in the reset with primary reliance on the delay produced by the integrator 70 between the flip-flop 54 and the AND gate 64. Thus, as will be apparent, the input circuit will accept an input signal which will first set the flip-flop 54 and actuate the first OR circuit 18. The OR circuit 18, as earlier discussed, will cause delay 20 to send a reset pulse to the flip-flop 54 through differentiator 68 and reset line 62 to thereby reset flip-flop 54 and cause a signal to go to the second OR circuit 24. However, if the circuit was already in its reset condition then the reset signal in going through the AND circuit 64, would AND with such reset pulse and cause a pulse to go through the inverter 66 and on to the next input circuit in the manner previously explained.

It will be apparent that the reset pulse to the differentiator 68 may come from the delay unit 20 or from another input circuit. The reset pulse may be provided by the second OR circuits 24 when the input circuit is being used as a subtractive channel in the manner indicated in FIG. 2 of the drawing. While a Schmitt trigger circuit 52 is shown, it will be understood that where an external pulse generator is used as a counting device, which is not provided with contacts but merely provides an input pulse, that the Schmitt trigger circuit could normally be eliminated and the pulse from the generator fed directly to differentiators 56 or 58 as desired.

Figure 4:
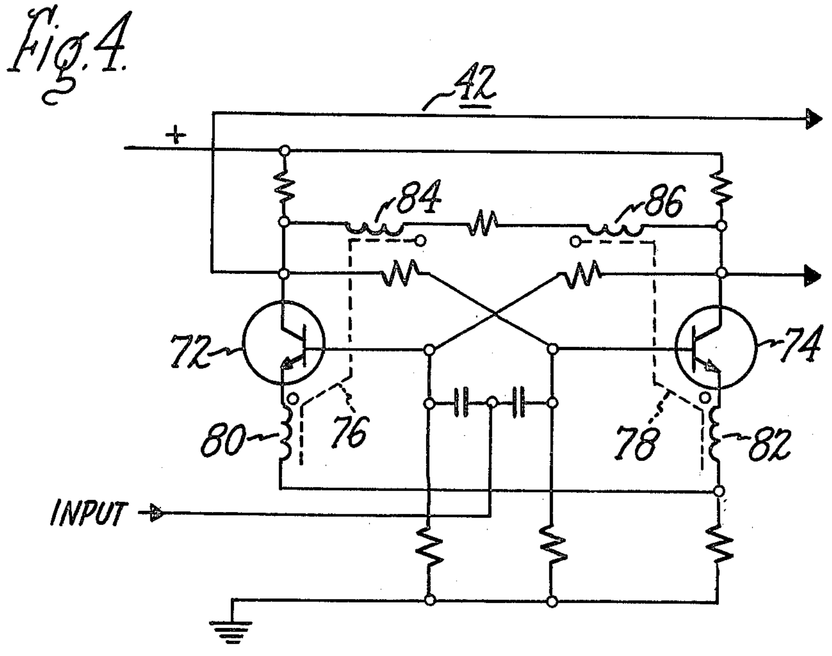
FIGURE 4 is a schematic diagram of a preferred form of drive circuit provided with a permanent memory to prevent adding superfluous counts in the output of the totalizer of this invention.

In order to drive any type of desired end recording and/or counting device a solid state static switching device 16 is utilized as the switching output of the totalizer of this invention. In order to drive such static switching device a driving circuit 42 is provided. The schematic of a preferred form, which will aid in eliminating superfluous counts, is shown in FIG. 4 of the drawing. The static switch driving circuit comprises a transistor flip-flop circuit with each transistor having an emitter follower output. As shown in the drawing, the driving circuit comprises the transistors 72 and 74 and is designed to change state with each input from the output of the divide-by circuit 40. In order that no counts be added in the system which are not present in one of the input channels, a permanent memory is added to the transistor flip-flop circuit to prevent any superfluous counts being added. As is well known, a common transistor flip-flop will have no memory when power is removed and may return to either of its two stable states when the power is restored. This means that such a flip-flop circuit would have a probability of 1 in 2 of adding a count to the output at the time that the power was restored. To eliminate this possibility, the flip-flop circuit shown in FIG. 4 is given a permanent memory in the form of a pair of magnetic cores, 76 and 78, which makes certain that the flip-flop comprising transistors 72 and 74 will always return to the state that it was in at the time of a power outage.

As shown in FIG. 4, the set coils 80, 82 of the core members 76, 78 are in the emitter lines of the respective transistors 72 and 74, while the reset coils 84, 86 are in the cross collector coupling lines, as shown. In this manner, as will be understood, at any time a power outage is experienced by the totalizer, when such power outage is restored the flip-flop comprising transistors 72 and 74 will always return to the state that such flip-flop was in at the beginning of the power outage.

When it is desired to provide monitoring counters, as shown in FIG. 2, pulse counter drive devices are provided, actuated by the input circuits or the output of the divide-by circuit, as indicated in FIG. 2. A novel pulse counter drive mechanism is utilized in the preferred embodiment of this invention.

Figure 5:
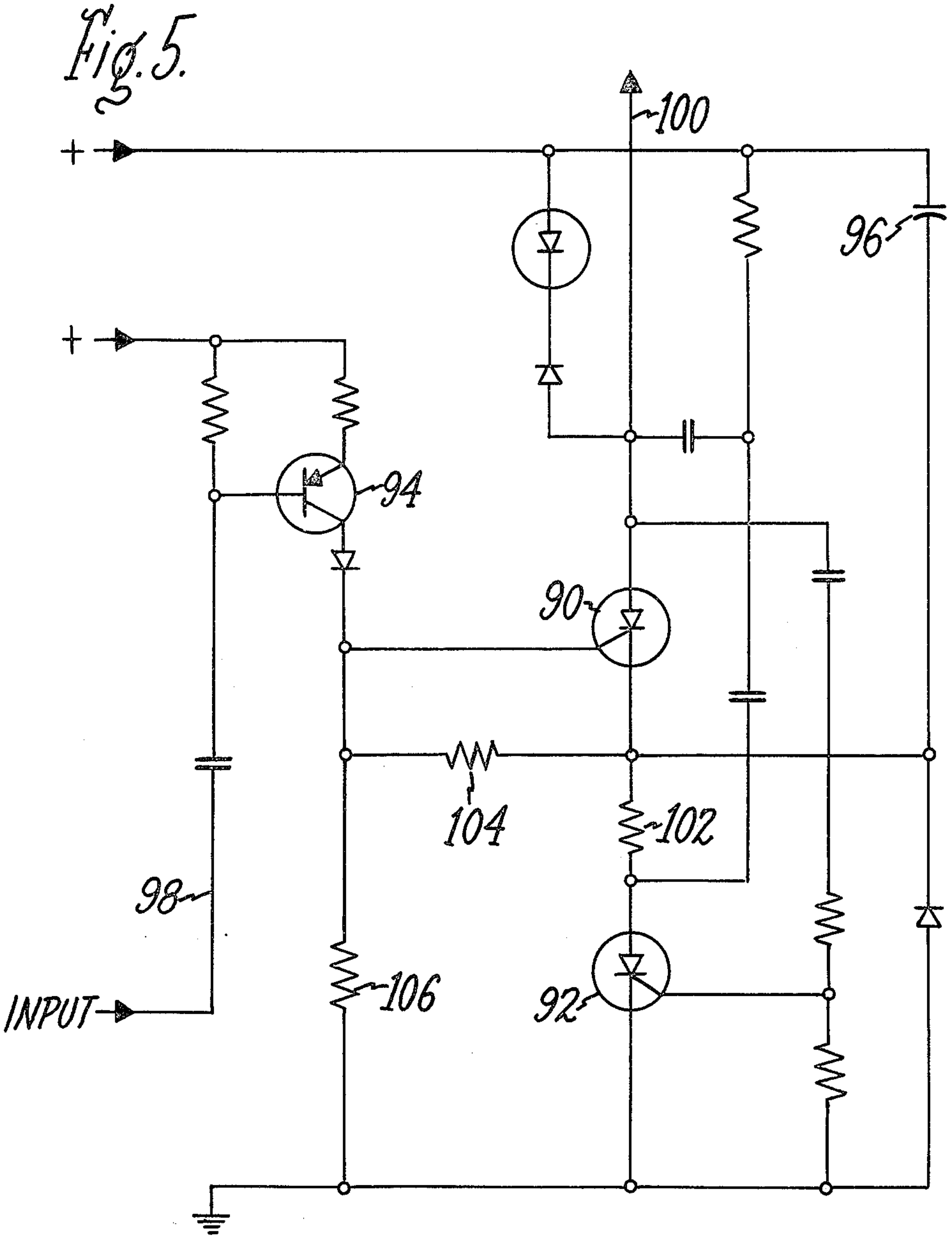
FIGURE 5 is a schematic diagram of a preferred form of pulse counter drive circuit which may be used to operate individual counters when a monitoring function is desired.

FIGURE 5 shows a schematic diagram of the preferred pulse counter drive mechanism which may be used to drive individual pulse counters to provide a running count of the input to the various individual input circuits of the totalizer of this invention. The drive circuit shown in FIG. 5 may be an element of either the drive 34 or the drive 36 as is indicated in FIG. 2 of the drawing. Normally three drive circuits will be provided in each drive module 34 or 36 as is indicated in FIG. 2 of the drawing. The drive circuit of FIG. 5 will be driven by a pulse output from any of the input circuits 10, 12, 14 or the subtract circuits 30 or 32, as well as by a pulse output of the divide-by circuit 40. In each case, in the preferred embodiment, the pulse will be brought to a pulse counter drive similar to that disclosed in FIG. 5. As will be understood, the output of the pulse counter drive may drive an electromechanical pulse counter mechanism as indicated at 38 and 39 in FIG. 2.

As shown in FIG. 5 of the drawing, a pair of silicon controlled rectifiers 90 and 92 are provided; in conjunction with a transistor 94 and a normally charged capacitor 96. The SCR's 90 and 92 are normally off. SCR 90 is turned on by a pulse from transistor 94, transistor 94 in turn being turned on by an input pulse over the line 98, which pulse may be provided by any of the input circuits or by the divide-by circuit. As the SCR 90 is turned on, the capacitor 96 is discharged rapidly through the pulse counter mechanism, such as 38 or 39, over the line 100. As capacitor 96 discharges, the current through the SCR 90 will diminish to below the required holding current and will therefore be turned off. When SCR 90 is turned off, a differentiated pulse will be sent to the second SCR 92 turning it on. The second SCR 92 rapidly recharges the capacitor through the current limiting resistor 102. SCR 92 will be turned off when the capacitor 96 is recharged and the current through SCR 92 drops below the required holding current. The capacitor 96 will hold its charge through the leakage path formed by the resistors 104 and 106. From this it will be seen that the pulse counter drive circuit of FIG. 5 provides a very reliable circuit for actuating a pulse counter device to provide an accurate count of each pulse which is fed into any of the impulse circuits indicated in FIG. 2 and also any of the output pulses which are fed out from the divide-by device 40.

From the above description of the preferred embodiments of the solid state totalizer of this invention, it will be apparent that the totalizer described fulfills all the objects and advantages hereinbefore set forth. It will be obvious to those skilled in the art that various changes may be made in many of the specific logic circuits which have been set forth in the preferred embodiment of this invention.

What is claimed as new and which it is desired to secure by Letters Patent of the United States is:

1. A solid state electrical driving circuit providing a pulsed output comprising:

(a) a pair of normally off silicon controlled rectifiers serially connected,
(b) an input line for receiving an input pulse,
(c) a transistor electrically connected between said input line and the gate of one of said rectifiers,
(d) a normally charged capacitor electrically connected to the junction between said pair of rectifiers,
(e) said one rectifier connected to an output line,
(f) said transistor turned on by an input pulse to turn on said one rectifier,
(g) said one rectifier acting to discharge said capacitor to provide a pulse to said output line,
(h) said one rectifier turning off when said capacitor is discharged and providing a pulse to turn on the other of said rectifiers,
(j) said other rectifier recharging said capacitor and turning off when said capacitor is recharged.

2. A solid state electrical driving circuit as claimed in claim 1 in which a current limiting resistor is connected between said other rectifier and said junction between said rectifiers for charging said capacitor.

3. A solid state electrical driving circuit as claimed in claim 1 in which a resistance is connected between said junction and ground to provide a leakage path for said capacitor.

References Cited

UNITED STATES PATENTS

| | | | |
|---|---|---|---|
| 3,167,661 | 1/1965 | Rhodes | 328—66 X |
| 3,171,040 | 2/1965 | Goebez | 328—67 X |

ROY LAKE, Primary Examiner

J. B. MULLINS, Assistant Examiner

U.S. Cl. X.R.

307—252, 284, 305